US006818893B2

(12) United States Patent
Carter

(10) Patent No.: US 6,818,893 B2

(45) Date of Patent: Nov. 16, 2004

(54) FIRE DETECTION SENSORS

(75) Inventor: Christopher Frederick Carter, Wooton (GB)

(73) Assignee: Infarred Integrated Systems Limited, Northants (GB)

( * ) Notice: Subject to any disclaimer, the term of this patent is extended or adjusted under 35 U.S.C. 154(b) by 19 days.

(21) Appl. No.: 10/071,589

(22) Filed: Feb. 8, 2002

(65) Prior Publication Data

US 2002/0109096 A1 Aug. 15, 2002

(30) Foreign Application Priority Data

Feb. 14, 2001 (GB) ............................................ 0103632
Mar. 1, 2001 (GB) ............................................ 0105111

(51) Int. Cl.[7] .................................................. G01J 5/26

(52) U.S. Cl. .............................. 250/339.07; 250/339.04

(58) Field of Search ....................... 250/339.07, 339.04, 250/339.05, 339.14, 336.1, 338.1, 349, 342, 339.15

(56) References Cited

U.S. PATENT DOCUMENTS

| | | | | |
|---|---|---|---|---|
| 4,179,606 A | * | 12/1979 | Nakauchi et al. | 250/339.15 |
| 4,553,031 A | | 11/1985 | Cholin et al. | 250/339 |
| 5,153,722 A | | 10/1992 | Goedeke et al. | 358/108 |
| 5,589,682 A | * | 12/1996 | Brown et al. | 250/214 A |
| 5,625,342 A | | 4/1997 | Hall et al. | 340/578 |
| 6,239,433 B1 | * | 5/2001 | Porter | 250/338.3 |
| 6,278,374 B1 | * | 8/2001 | Ganeshan | 340/578 |
| 6,518,574 B1 | * | 2/2003 | Castleman | 250/339.15 |

FOREIGN PATENT DOCUMENTS

| | | | | |
|---|---|---|---|---|
| GB | 2 320 359 | | 7/1998 | G08B/17/12 |
| GB | 2 360 355 | | 9/2001 | G08B/17/12 |
| JP | 01026297 A | * | 1/1989 | G08B/17/12 |

OTHER PUBLICATIONS

U.S. patent application Ser. No. 09/558,279, Hollock et al., filed Apr. 25, 2000.

U.S. patent application Ser. No. 09/579,636, Galloway et al., May 26, 2000.

U.S. patent application Ser. No. 09/643,099, Galloway, filed Aug. 21, 2000.

U.S. patent application Ser. No. 09/805,091, Galloway, filed Mar.13, 2001.

U.S. patent application Ser. No. 09/826,126, Carter et al., filed Apr. 4, 2001.

U.S. patent application Ser. No. 09/912,242, Galloway, filed Jul. 23, 2001.

U.S. patent application Ser. No. 10/005,883, Whatmore, filed Dec. 3, 2001.

U.S. patent application Ser. No. 10/022,966, Porter et al., filed Dec. 13, 2001.

U.S. patent application Ser. No. 10/0228,940, Porter et al., Dec. 21, 2001.

* cited by examiner

*Primary Examiner*—Constantine Hannaher
*Assistant Examiner*—Otilia Gabor
(74) *Attorney, Agent, or Firm*—Moser, Patterson & Sheridan, L.L.P.

(57) ABSTRACT

A flame detection apparatus has a focused array based sensor which is responsive to radiation having a predefined wavelength for generating an image of the infrared radiation emitted within a monitored region, and means for measuring the spectral ratio of the intensity of radiation having a first wavelength emitted within the monitored region to the intensity of radiation having a second wavelength emitted within the monitored region. Processing means analyzes the output of the focused array based sensor and the spectral ratio measuring means for responses indicative of the presence of a flame within the monitored region.

11 Claims, 2 Drawing Sheets

FIRE DETECTION SENSORS

BACKGROUND OF THE INVENTION

Field of the Invention

The present invention relates to sensors for detecting unwanted flames within a designated area by monitoring for characteristic infrared radiation emitted by such flames.

Flame detection sensors are known which monitor a region for the characteristic infrared radiation emitted by a flame, the detection of such radiation being taken to be an indication that a flame is present and that a fire alarm should be signaled. However, interfering or false alarm radiation sources, for example halogen lamps, reflected sunlight, discharge lamps, electric welders, hot pipes etc., are often also present in a monitored region which can lead to a sensor incorrectly detecting the presence of a flame.

Existing infrared flame detectors use a variety of different technologies to gather as much information as possible about the radiation emitted within a target area within limits set by cost, complexity, reliability and size. A typical infrared flame detector known in the art monitors for radiation emitted by hot carbon dioxide within a narrow wavelength band around a wavelength of 4.3 p.un and compares this to the radiation at a nearby wavelength, e.g. 5. Spm. For flames, this spectral ratio of the radiation intensity at 4.3 pm to the radiation intensity at 5.5 pm will be much higher than would be the case for radiation emitted by any other source at the same temperature as a flame, and this alone gives a good indication of the presence or absence of a flame, This system may be complemented by analysis of the flicker frequencies in the signal or by examining the correlation of the signals at the two wavelengths. The control system for such an arrangement is typically programmed with a preset threshold value for the ratio of (4.3 um Intensity)/(5.5 urn Intensity), and if that value is exceeded for a preset time, then an alarm will be activated.

This basic system has the problem, however, that it fails to correctly identify a fire situation in certain circumstances. In particular, if an intense false alarm radiation source is present as well as a flame then the 4.3 um/5.5 um intensity ratio will be dominated by the most intense source present and the relatively low flux of the 4.3 um radiation from a distant or weak flame will not be registered with sufficient accuracy, resulting in the system inferring from the value of the intensity ratio that no flame is present when, in fact, there is. Furthermore, some false alarm sources can generate a spectral output that is very flame-like. This can happen if the source has emitting parts at very different temperatures as in a convector/radiator electric fire or if the source is not a true black body as with mercury or sodium discharge lamps (such sources emit radiation over a large number of narrow wavebands).

in order to overcome this problem, use of an array based infrared detector has been proposed in which an image of die protected area is focused onto a focal plane array. Such a device, when combined with appropriate signal processing, can allow estimates of the angular size of one or more emitting objects and analyze their internal structure and movement for flame-like features. Unfortunately, it is not always possible to make an unambiguous decision on whether certain objects are flames without the spectral information described above. The use of two such arrays overcomes this problem since it will then be possible to calculate a value of the ratio I (4.3 um)/I(5.5 um) for each separately focused object. This solution is, however, very expensive due to the requirement for two high-resolution sensor arrays and may be too costly for many applications. Other systems have been proposed which use mechanical scanning arrangements, but these have the drawback that observation times are reduced and fast events may be missed. Furthermore, in certain application areas there may be considerable customer aversion to the use of moving parts in an apparatus.

SUMMARY OF THE INVENTION

According to the present invention there is provided a flame detection apparatus comprising means for generating an image of the infra-red radiation emitted within a viewing region, means for measuring the spectral ratio of the intensity of radiation having a first wavelength emitted within the viewing region to the intensity of radiation having a second wavelength emitted within the region, and processing means which analyses the outputs of said image generating and spectral ratio measuring means for responses indicative of the presence of a flame.

A flame detection apparatus in accordance with the invention has the advantage that it enables particularly accurate and reliable detection of a flame in a monitored region even in the presence of interfering or false alarm radiation sources.

The means for generating an image of the infrared radiation emitted within the viewing area is a preferably focused array based sensor responsive to radiation having a predefined wavelength, preferably in the range 2 to 15 um. The term an array used in this document refers to a two dimensional array, which might typically comprises a 16 by 16 grid of sensors, which is able to generate a two dimensional image of a viewing field. Furthermore, the means for measuring the spectral ratio includes at least one unfocussed volumetric sensor which measures the radiation emitted within the region having one of said first and second wavelengths. This has the advantage that, since the system only requires a single focused array sensor, it is much cheaper than prior art systems of comparable accuracy and reliability.

In one embodiment of the invention, the array sensor is sensitive to one of the first and second wavelengths, preferably the first wavelength which is 4.3 um, and the volumetric sensor is responsive to the other of the first and second wavelengths, preferably the second wavelength which is 5.5 um the processing means summing the total radiation incident on the array based sensor and comparing it with the output of the volumetric sensor in order to calculate the spectral ratio. This has the advantage of reducing the number of components in the system and hence its complexity and cost. Preferably, however, the system includes two volumetric sensors, one that operates at the first wavelength and the other at the second wavelength, the output of the two volumetric sensors being used to calculate the spectral ratio. The array sensor is then dedicated to generating an image of the viewed region. This has the advantage of reducing the complexity of the processing means required to operate the system.

Preferably, the first wavelength is 4.3 um and the second wavelength is 5.5 um, there being a well defined threshold value for the spectral ratio resulting there from which, if exceeded, provides a strong indication of the presence of a hydrocarbon flame. Alternatively, however, other wavelengths could be used, for example 2.9 um instead of 4.3 um, in order to enable other types of flame, in particular non-hydrocarbon flames to be detected.

The operation of the system may be further improved by provision of a second focused array based sensor responsive to radiation having a wavelength which is different from that of said first focused array based sensor. Also, a further unfocussed volumetric sensor may be used which measures the intensity of short wavelength or visible radiation. This has the advantage of further reducing the instances of false alarms being sounded by the system due to, for example, direct sunlight blinding the system. Furthermore, at least one further sensor which measures at least one of: the actual temperature, the rate of rise of temperature and the vibration within the monitored area may also being included in the system, which further information may be utilized by the processing means as a further confirmation of the presence or absence of a fire within the viewing area.

The present invention further provides a method of detecting a flame comprising the steps of measuring the intensity of radiation having a first wavelength within a monitored region, measuring the intensity of radiation having a second wavelength within the monitored region, calculating the spectral ratio of the intensity of the radiation having the first wavelength to the intensity of the radiation having the second wavelength and comparing it to a predefined threshold value indicative of the presence of a flame, generating an image of the infra-red radiation within the monitored region, analyzing the image for features indicative of the presence of a flame within the monitored region, and activating an alarm if the results of the spectral ratio analysis and the image analysis fit a predefined profile indicative of the presence of a flame.

Preferably the first wavelength is 4.3 um and the second wavelength is 3.5 um, particularly effect detection of hydrocarbon fires thereby being possible. However, other wavelengths may also be used in order to detect other types of fires, such as non-hydrocarbon fires, in particular 2.9 um.

In the preferred embodiment, the analysis includes the steps of discerning the number of separate dynamic radiation sources present in the viewing area and analyzing at least one of the shape, movement and intensity of each source for predefined flame-like qualities.

According to an advantageous development of the invention, the method includes the further step of measuring at least one of the actual temperature, the rate of rise of temperature and the vibration within the monitored region, and analyzing the characteristics thereof for behavior indicative of the presence of a flame, by means of which additional information is available to the processor for confirming the presence or absence of a flame. The accuracy and reliability of the system may be still further improved by measuring the intensity of at least one of the short wavelength radiation and the visible radiation within the viewing area and analyzing the profile thereof for characteristics indicative of a non-flame radiation source.

BRIEF DESCRIPTION OF THE DRAWINGS

In order that the invention may be well understood, there will now be described some embodiments thereof, given by way of example, reference being made to the accompanying drawings, in which.

DETAILED DESCRIPTION OF THE PREFERRED EMBODIMENT

Figure 1:
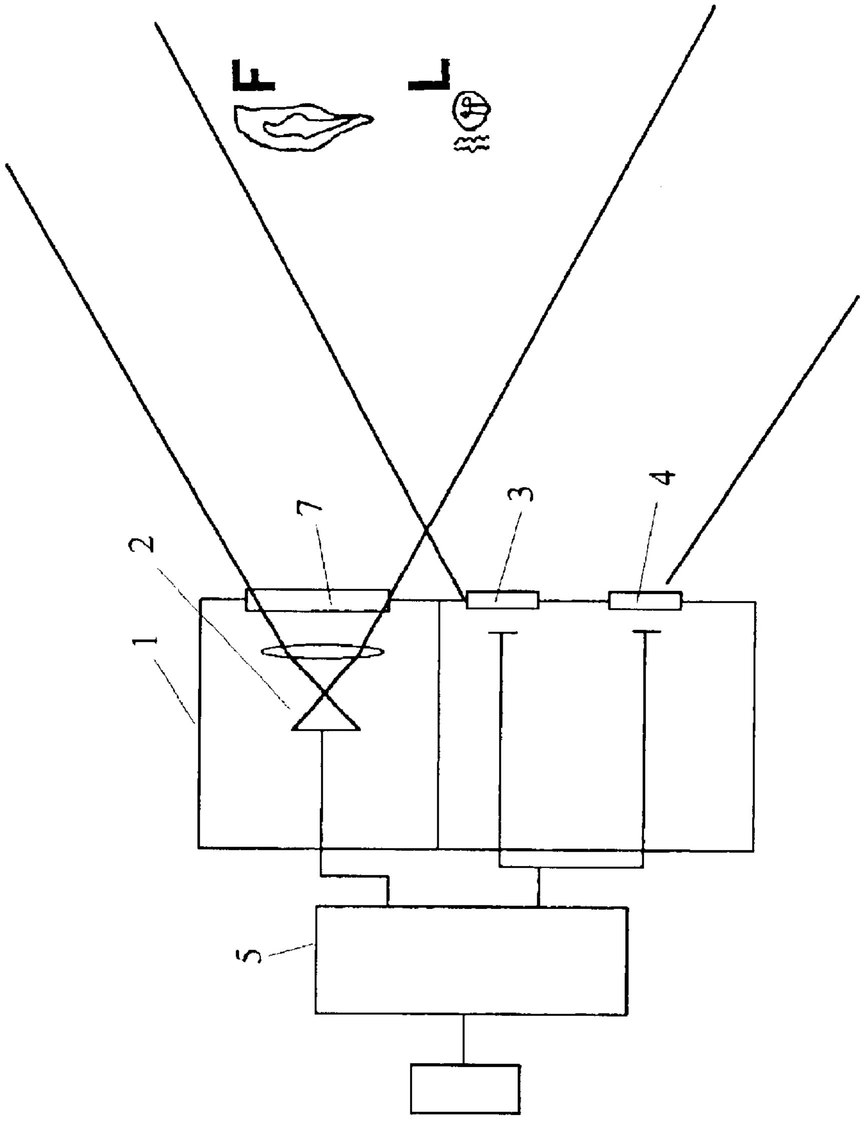
FIG. 1 is a schematic representation of a flame detection apparatus of the invention.

Referring to FIG. 1, there is shown a flame detection apparatus I comprising an array detector 2, an unfocussed volumetric 4.3 um detector 3 and an unfocussed volumetric guard channel 5.5 um detector 4. The array detector 2 senses a focused image of the monitored area whilst the volumetric sensors view of the scene is unfocussed. The field of view of all three detectors is similar and will typically be approximately 90 degrees. The apparatus also includes a processor 5 which receives the outputs of the detectors 2,3,4 and activates an alarm upon determining from those outputs that a flame is present in the monitored area.

The outputs from the two volumetric detectors 3,4 are electronically processed by known means so as to produce numerical estimates of the overall signal level and of the spectral ratio of the two channels. Temporal analysis of this data will also produce a simple characterisation of the modulation frequencies present in terms of the center frequency and bandwidth, The processor 5 uses this information to give one of three initial assessments of the scene once activity has been detected: flame-like, non flame-like and intermediate. The output of the array detector 2, which in the illustrated embodiment includes a 4.3 urn filter 7 to enhance flame discrimination, is also initially analysed to give one of three assessments of the scene: (1) saturation or nonsense; (2) single source present; (3) two or more angularly separated sources present. Finally the processor analyses the temporal and spatial characteristics of each source that is detected to decide whether the data is compatible with known characteristics of a flame and the size of the source in angular terms.

Figure 2:
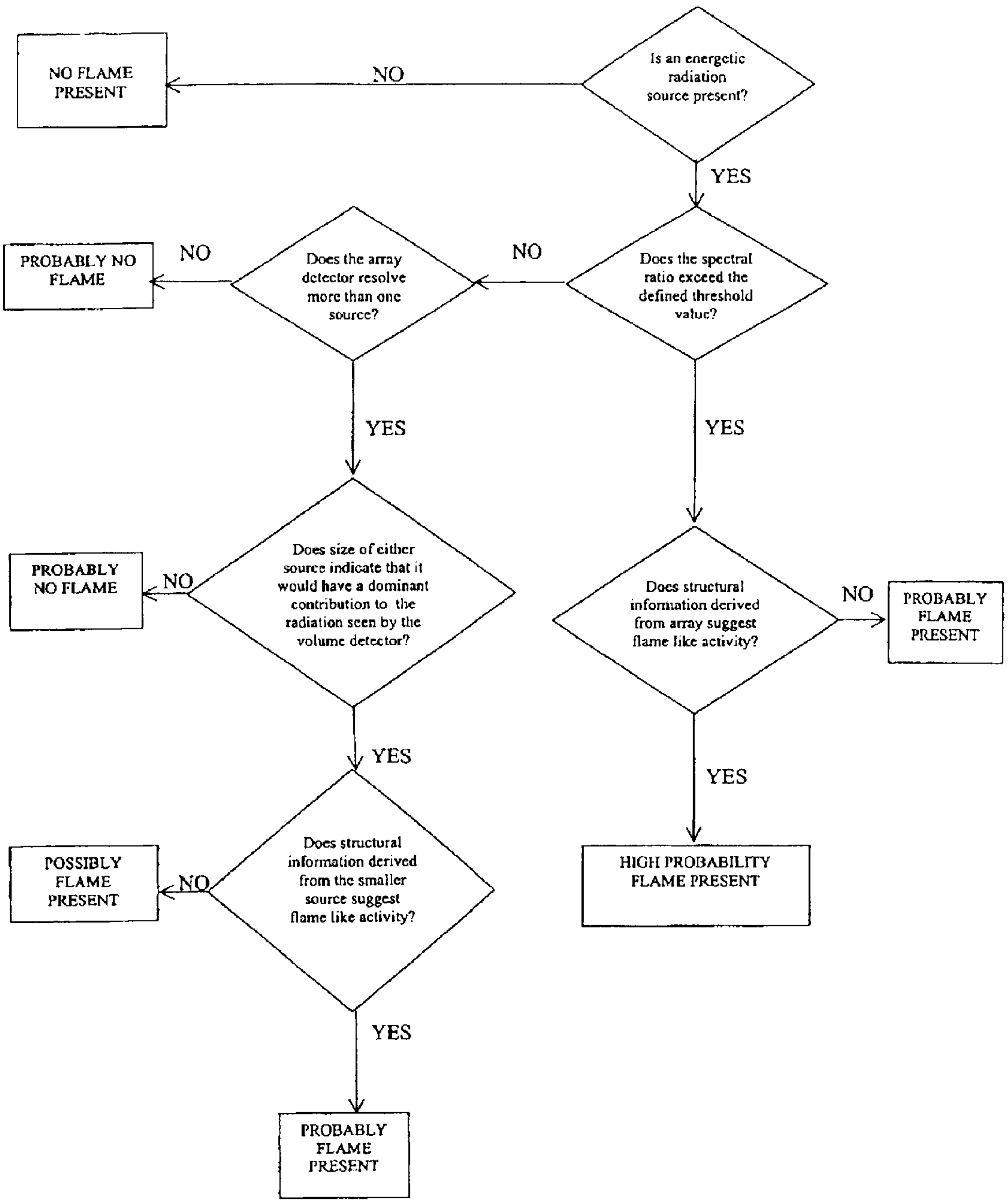
FIG. 2 is a flow diagram of the steps followed by a processor associated with the apparatus of the invention in identifying the existence of a flame in a monitored region.

Using the information obtained from the sensors, the processor is able, then, to analyse the radiation sources identified in the monitored region, and, following the steps shown in the flow diagram in FIG. 2, and in tables 1 and 2 below to decide whether and what type of alarm should be activated as explained below in connection with five main scenarios which can be expected to arise in a monitored region.

TABLE 1

Initial Single Element Analysis

| | | Flame Like | Intermediate | Non-Flame Like |
|---|---|---|---|---|
| Initial Array Analysis | Saturates or Nonsense | | A | |
| | Single Source | B | C | D |
| | Two Sources | | E | F |

TABLE 2

Decision Tree

| Initial Assignment | Likely Scenarios | Decision Tree and output |
|---|---|---|
| A | Large close fire or<br>Tamper or<br>Fault | Warning!<br>If temperature is showing a large rise: Alert!<br>If self rest systems correct and situation persists: Fire! |
| B | Probable fire | Alert!<br>If array data confirms flame like features in at least one identified sources then: Fire! |
| C | Deep sooty fire or Composite false alarm | Warning!<br>If array data confirms flame like features Then; Alert!<br>If source is growing and teperature sensor indicating rise then: Fire! |

TABLE 2-continued

| Decision Tree | | |
|---|---|---|
| Initial Assignment | Likely Scenarios | Decision Tree and output |
| D | Probable False Alarm | Activity!<br>Monitor Source using array. If persists And flame-like and grows then: Warning! |
| E | Probable fire in presence of false alarm | Warning!<br>Flame like structure identified in at least one source: Alert!<br>If this source grows and temperature sensor registers: Fire! |
| F | Probable fire in presence of false alarm | Activity!<br>Monitor larger source using array. If this grows and temperature sensor rises then: Warning!<br>Monitor smaller source using array. If any flame like features present or growth observed then: Warning! |

In table 1 there are shown six categorized outcomes from the initial assessment that has been carried out by the sensors. Each of these outcomes now becomes the start of a decision tree in which additional data from the sensors is made use of by the processor 5. It will be understood that the analysis suggested by the scheme of FIG. 2 and Tables 1 and 2 is being carried out continuously. Also in a complete instrument further data analysis will be performed that is not relevant to this invention and this could lead to further hardening of the 'possible' and 'probable' categories.

1) Single False Alarm Source

Analysis of the output of the array detector 2 reveals that only a single source is present in the target area, (which will typically be a hot object such as a halogen lamp or an electric fire). In a simple case, the output of the array 2 may be sufficient to determine that the object has no flame like characteristics. However, modulation of the source often occurs in practice, for example due to objects moving in front of it, and this can cause flame like characteristics which might result in the output from the array detector wrongly identifying the source as a flame. In the presence of such a false alarm source with no flame present, however, the spectral ratio measured from the source will fall below the predetermined value for a flame, and the system of the present invention therefore uses this information as a primary factor in making its determination as to whether or not to activate the alarm. As a secondary check, the array output can be further analysed for flame-like spatial features in the target such as size, movement and shape, and with all detector information combined, the false alarm can be positively identified with a high degree of certainty.

2) Single Flame at close range

When a flame is present close to the detection apparatus, several pixels of the array sensor will be illuminated, enabling reliable analysis of the source for flame-like spatial characteristics to be carried out, The spectral ratio calculated from the outputs of the unfocussed detectors 3, 4 will also indicate that the source is a flame, and the alarm can be activated with a high level of certainty.

3) Single Flame at Long Range

When a flame is present in the viewing area at a long distance from the detection apparatus so that perhaps only a single pixel of the array detector is illuminated, the spectral ratio calculated from the outputs of the unfocussed sensors will still give a good identification of the presence of a flame. The output of the array detector will give greater confidence to this identification since the angular size, position and intensity of the source are known and must follow reasonable limits (e.g. a wide source of low intensity cannot be a flame, and a source that is moving as an entity over large angular distances cannot be a flame). Accordingly, the source can be identified as a flame and an alarm activated with a high probability.

4) Both a Flame and a False Alarm Source at Close Range

With both a flame and a false alarm source present close to the detection apparatus, the spectral ratio calculated from the unfocussed detectors 3,4 will be corrupted by the radiation emitted by the false alarm source. However, with the flame close to the detector, the value of the spectral ratio will still exceed the predetermined threshold value, leading the processor to determine a flame is present with reasonable certainty. Furthermore, provided both sources illuminate several pixels in separate parts of the array, then structural features such as shape, movement and intensity derived from the array by the processor will provide confirmation of the spectral data arid could also be used, in an advanced configuration, to determine the direction of the fire.

5) A Flame at Long Range and an Intense False Alarm Source

If a flame is present together with an intense false alarm source, the flame being located at a large distance from the detector, the radiation received by the unfocussed detectors 3,4 will be dominated by the false alarm source so that the spectral ratio calculated from the output of the volumetric detectors 3,4 will fall below the threshold value for the alarm to be activated. However, as long as there is an angular separation between the flame and the false alarm source, the existence of a signal from the flame will indicate that an additional radiation source is present in the scene and that its size is such that it would not, in fact, be a significant contributor to the total radiation seen by the unfocussed detectors 3,4. Although a reliable spectral ratio cannot be obtained for the flame alone in these conditions, the system of the present invention may still have sufficient confidence in the existence of a flame to activate the alarm or possibly to activate a lesser warning signal. In order to improve the reliability of the system in this scenario, additional signal processing methods, such as time series analysis of the single pixel flame signal from the array, may also be performed by the processor.

It will be understood from the above that, whilst systems of the prior art are able to perform reliably in one or perhaps some of the scenarios described above, the present invention provides a system which is able reliably to detect a flame and distinguish it from a false alarm source in all practical scenarios.

In practice, the system may be programmed to provide one of four different alarm messages depending on the conditions which are discerned within the viewing area, namely- Activity! where energetic radiation sources have been detected in the scene but are probably not flames.

Warning! where there is a possibility that flames are present;

Alert! where there is a high probability that flames are present; and

Fire! Where there is a high probability of flames within the monitored area.

The reliability of the system may be further improved by including an absolute temperature sensor on the instrument casing, the output of which may be utilised by the processor as a further factor in ascertaining the nature of a radiation source located within the viewing area. Other sensors which might be utilised to improve the operation of the system still further are a rate of rise of temperature and a vibration sensor. The system may also include a third unfocussed volumetric sensor which measures the intensity of short wavelength or visible radiation. In this way, it is possible to derive additional information about false alarm sources such as the sun and welding equipment, which further enhances the systems reliability and accuracy.

In an alternative embodiment of the invention not illustrated, the processor could derive an estimate of the total radiation around the 4.3 um wavelength for use in calculating the spectral ratio by summing the total 4.3 um radiation incident on the array detector 2. In this way the 4.3 um volumetric sensor may be dispensed with. The system may then be further enhanced by provision of a second array sensor which operates at a different wavelength to the first.

In some situations, it may not be necessary to restrict the wavelengths incident on the array detector to around the 4.3 um wavelength. For example, a wide band sensor covering a range of approximately 2 um to 15 um would image hot objects that were not necessarily flames. This would enable early detection of a smoldering fire or of objects that were heated by an obscured flame. It would also enable the flame detector apparatus to function also as a person or animal sensor in a security application.

In very severe conditions, it is possible that the apparatus of the invention could be blinded by very intense light or confused by an intense very close fire. In order to overcome this problem, the apparatus could be equipped with additional low cost sensors such as silicon photodiodes for visible light and thermistors or the like to monitor actual temperature and rate of rise of temperature. The provision of such additional sensors would enable the processor to give a reliable indication of the situation in circumstances where the primary detectors are blinded.

Although the above embodiments have been described in relation to monitoring a region for hydrocarbon flames and the operating wavelengths of the various detectors specified accordingly, it will be understood that the system of the invention may also be utilised to monitor for non-hydrocarbon fires by varying the wavelengths to which the detectors are responsive. For example, if the 4.3 um volumetric detector is replaced by one responsive to 2.9 um, the system can be used to monitor for the emissions from hot water vapor.

What is claimed is:

1. A flame detection apparatus comprising a focused array based sensor responsive to radiation having a predefined wavelength for generating an image of the infra-red radiation emitted within a viewing region, means for measuring the spectral ratio of the intensity of radiation having a first wavelength emitted within the viewing region to the intensity of radiation having a second wavelength emitted within the region, wherein the means for measuring the spectral ratio includes an unfocussed volumetric sensor which measures infrared radiation emitted within the viewing region having said second wavelength, processing means which analyzes the outputs of said image generating and spectral ratio measuring means for responses indicative of the presence of a flame and a second focused array based sensor responsive to radiation having a predefined wavelength which is different from that of said first focused array based sensor.

2. A flame detection apparatus according to claim 1, wherein the array based sensor is sensitive to radiation having a wavelength within the range of substantially 2 $\mu$m to 15 $\mu$m.

3. A flame detection apparatus according to claim 2, wherein the array based sensor is sensitive to radiation having a wavelength of substantially 4.3 $\mu$m.

4. A flame detection apparatus according to claim 1, wherein the second wavelength is substantially 5.5 $\mu$m.

5. A flame detector according to claim 1, further including at least one sensor for monitoring at least one of the actual temperature, the rate of rise of temperature and the vibration within the monitored area.

6. A method of detecting a flame comprising the steps of measuring the intensity of radiation having a first wavelength within a monitored region, measuring the intensity of radiation having a second wavelength within the monitored region, calculating the spectral ratio of the intensity of the radiation having the first wavelength to the intensity of the radiation having the second wavelength and comparing it to a predefined threshold value indicative of the presence of a flame, generating an image of the infra-red radiation within the monitored region, analyzing the image for features indicative of the presence of a flame within the monitored region, and activating an alarm if the results of a spectral ratio analysis and the image analysis fit a predefined profile indicative of the presence of a flame and measuring the intensity of at least one of the short wavelength radiation and visible radiation within the monitored area and analyzing the profile thereof for characteristics indicative of a non-flame radiation source.

7. A method of detecting a flame according to claim 6, wherein said first wavelength is 4.3 $\mu$m.

8. A method of detecting a flame according to claim 6, wherein said second wavelength is 5.5 $\mu$m.

9. A method of detecting a flame according to claim 6, wherein said analysis of the image includes discerning the number of separate dynamic radiation sources present in the viewing area and analyzing at least one of the shape, movement and intensity of each source for predefined qualities similar to a flame.

10. A method of detecting a flame according to claim 6, further including the steps of measuring at least one of the actual temperature, the rate of rise of temperature and the vibration within the monitored region and analyzing characteristics thereof for behavior indicative of the presence of a flame.

11. A flame detection apparatus comprising a focused array based sensor responsive to radiation having a predefined wavelength for generating an image or the infra-red radiation emitted within a viewing region, means for measuring the spectral ratio of the intensity of radiation having a first wavelength emitted within the viewing region to the intensity of radiation having a second wavelength emitted within the region, and processing means which analyzes the outputs of said image generating and spectral ratio measuring means for responses indicative of the presence of a flame, wherein the means for measuring the spectral ratio includes an unfocussed volumetric sensor which measures infrared radiation emitted within the viewing region having said second wavelength and a second unfocussed volumetric sensor which measures infra-red radiation emitted within the viewing region having said first wavelength.

* * * * *

UNITED STATES PATENT AND TRADEMARK OFFICE

CERTIFICATE OF CORRECTION

PATENT NO. : 6,818,893 B2 
DATED : November 16, 2004
INVENTOR(S) : Christopher Frederick Carter It is certified that error appears in the above-identified patent and that said Letters Patent is hereby corrected as shown below:

Title page,
Item [30], Foreign Application Priority Data,
please insert -- .6 -- after "0103632" and please insert -- .9 -- after "0105111"

Signed and Sealed this

Nineteenth Day of July, 2005

JON W. DUDAS
*Director of the United States Patent and Trademark Office*